Patented June 20, 1933  1,914,591

UNITED STATES PATENT OFFICE

HIROSHI ABE, OF FUKUSHIMA, JAPAN

METHOD OF MANUFACTURING ARTIFICIAL FLOWERS FROM COCOONS

Application filed March 2, 1932, Serial No. 596,328, and in Japan March 24, 1931.

The present invention relates to the method of manufacturing artificial flowers from cocoons, and the object thereof is to obtain by simple means the artificial flowers strong, lustrous and elegant, merely by cutting open and stripping cocoons.

Generally, the cocoon consists of a number of layers which may be stripped off and developed by cutting open a part of the cocoon.

One of the features of this invention is to obtain an artificial flower by cutting open a cocoon at a suitable part to make the petal or calyx of the desired artificial flower and utilizing the stripping nature of the cocoon itself to develope and strip off its layers after the arrangement of the petals of the natural flower.

A second feature is to obtain a many-petalled artificial flower by cutting open a cocoon from both ends in such a manner that they cross with each other and then turning them inside and outside at the narrow part of the cocoon.

A third feature is to make an artificial flower like lily by cutting open a cocoon slightly at one end and turning it inside out.

A fourth feature is to obtain an artificial flower such as a water lily by cutting open a cocoon horizontally and then stripping off its layers.

The fifth feature is to make a many-petalled artificial flower like a rose by cutting open a cocoon vertically from both ends to nearly its centre and stripping off and developing a part of it, while the other parts are turned inside out and stripped and developed.

The accompanying drawing shows several examples of the artificial flowers made according to this method. However, let it be understood that this invention is not limited to them, but various modifications may be made within the scope of the claim.

Figure 1:
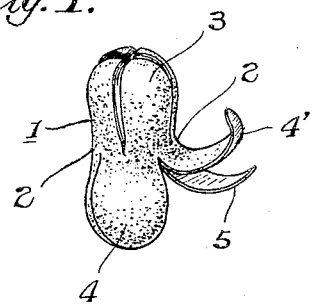
Figure 5:
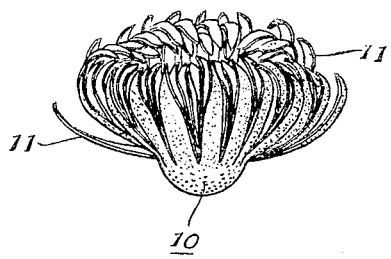
Figure 2:
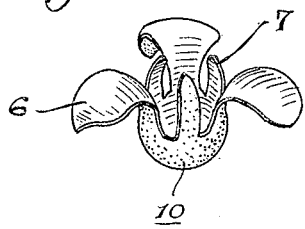
Figure 6:
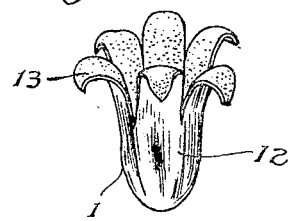
Figure 3:
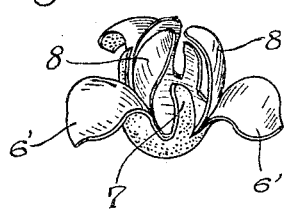
Figure 7:
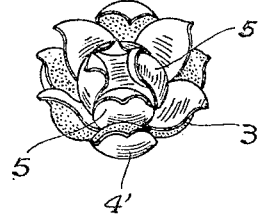
Figure 4:
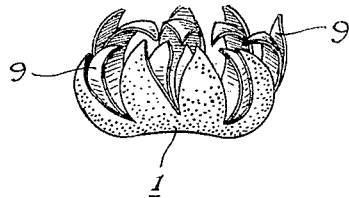

Figure 1 shows a cocoon with its both ends cut open vertically and its layers stripped off;

Fig. 2, the manner of manufacturing an iris according to this invention;

Fig. 3, the perspective of an iris completed by stripping off the petals of the artificial flower shown in Figure 2;

Fig. 4, a water lily made by cutting open a cocoon horizontally and stripping off and developing its layers;

Fig. 5, a chrysanthemum made by cutting a cocoon into strips from one end and stripping off and developing each layer;

Fig. 6, a lily made by cutting open a cocoon vertically into equal parts and turning the whole cocoon inside out and Fig. 7, a rose made by cutting open a cocoon from both ends and turning up petals with the narrow part of the cocoon as their bases.

If a silkworm cocoon 1 as shown in Fig. 1 is cut open crosswise vertically from both ends to the narrow part 2, the cut pieces 3 and 4 can be developed, and also the toughness of the skin of the cocoon may be utilized to strip such pieces further into a number of pieces such as 4′ and 5, maintaining their developed condition.

In Fig. 2, an oval or egg-shaped cocoon 10 is cut open at its one end to form petals 6 and 7 of different sizes after the petals of an iris. If big petals 6 are further stripped off to make petals 6′ and 8, an artificial iris as shown in Fig. 3 may be obtained.

To make a water lily as shown in Fig. 4, a silkworm cocoon 1 is cut open horizontally at its side and then is stripped to form a number of petals 9.

In Fig. 5, a chrysanthemum may be made by cutting an egg-shaped cocoon 10 into strips from one end approximately to the other and then coloring it properly.

To make a lily as shown in Fig. 6, a cocoon 1 is cut vertically into six equal parts from one end to the narrow part and after it is turned inside out so as to expose the inner surface 12 to the outside and pieces 13 are cut into petals, they are developed suitably to form a lily.

In Fig. 7, a rose may be made, as shown in Fig. 1, by firstly cutting open a silkworm cocoon 1 crosswise at its both ends in such a manner that the cut ends cross with one another, turning down the stripped lower pieces 4′ and 5 with the narrow part as their bases so as to envelope the upper piece 3 properly.

I claim:

Method of manufacturing artificial flowers from cocoons, which consists in cutting open a cocoon from a suitable part, turning the whole cocoon inside out so as to expose its inner surface to the outside and cutting and developing the cut pieces into the petals of the desired artificial flower.

HIROSHI ABE.